UNITED STATES PATENT OFFICE.

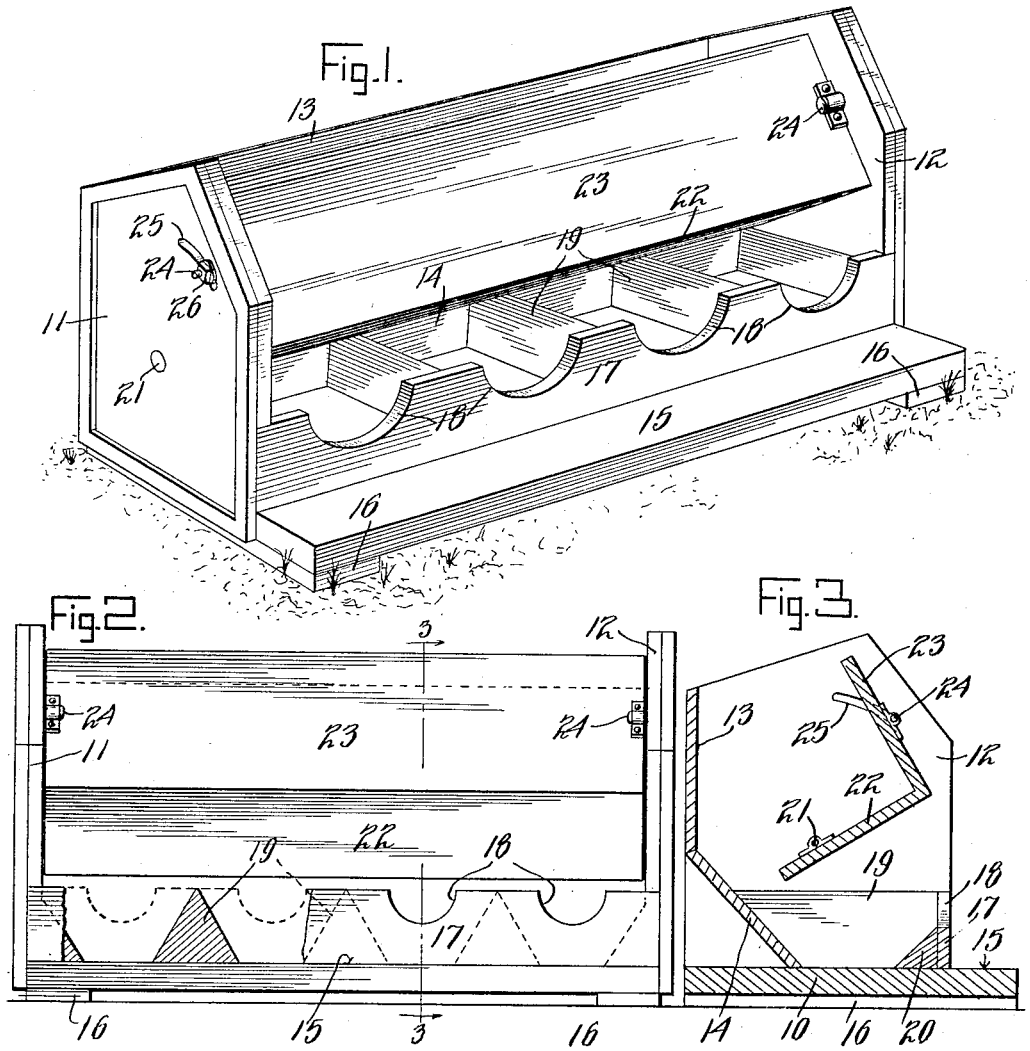

PETER BARLAND, OF ANACONDA, MONTANA.

FEED-TROUGH STRUCTURE.

1,386,225.	Specification of Letters Patent.	Patented Aug. 2, 1921.

Application filed April 9, 1919. Serial No. 288,868.

*To all whom it may concern:*

Be it known that I, PETER BARLAND, a citizen of the United States, residing at Anaconda, in the county of Deerlodge and State of Montana, have invented certain new and useful Improvements in Feed-Trough Structures, of which the following is a specification.

My said invention relates to an improved construction of hog feeders and consists in a novel combination and arrangement of parts whereby various advantages in use and operation are secured, all as will be hereinafter more fully described and claimed.

Referring to the accompanying drawing which is made a part hereof and on which similar reference characters indicate similar parts.

Figure 1 is a perspective view of the complete trough as constructed in accordance with my invention.

Fig. 2, a front elevation of the same with a part broken away to more clearly show the shape of the individual troughs, and Fig. 3, a cross section on the dotted line 3—3 in Fig. 2.

In said drawings the portion marked 10 represents the bottom of the trough, 11 and 12 the ends, 13 the back, and 14 an angular member forming the back of the feed trough proper. The bottom portion 10 extends a little beyond the front of the end members 11 and 12 to form a foot rest 15 for the animal to stand upon with its front feet. This bottom portion is supported above the ground upon a pair of sills 16. A front member 17 is provided for the trough formed with semi-circular openings 18 in its upper edge, corresponding in number to the number of individual feed troughs with which the device is equipped and adapted to receive the throat of the animal. Triangular partitions 19 are secured at intervals between the front 17 and the angular portion 14 of the back, which serve to divide the trough structure as a whole into the appropriate number of individual feed troughs. Each individual trough is provided at its front end with an angular member 20 which in conjunction with the members 19 and the member 14 forms a hopper-like receptacle to receive the food which, by reason of said form, holds the food to enable the animal to consume the same without waste and also provides a receptacle that can be readily cleaned.

Mounted on trunnions 21 pivoted in the end members 11 and 12 is a headboard 22 which has connected at right angles thereto a similar board 23 having bolts 24 secured in the ends thereof and passing through curved slots 25 formed in the end members 11 and 12. Mounted on the bolts 24 on the outer sides of the end members 11 and 12 are clamping nuts 26 which afford means for locking the headboard in any desired position. The members 22 and 23 comprising this headboard form one side of a main hopper while the back 13 and 14 form the other side of the hopper into which food is deposited and from which it is fed into the respective small troughs.

By such a construction of feed trough, various advantages are secured which in actual practice have been found of considerable importance. In the first place, by the use of such a trough the hogs can be fed without any interference from the animals, it being only necessary to deposit the feed in the opening between the upper edge of the back 13 and the upper edge of the front member 23 when it will be guided by the angular sides into the respective individual feed compartments. The angular member composed of the parts 22 and 23 prevents any possible interference with this work by the animals themselves. As is well known the natural instinct of the hog is to get his fore feet into the trough, if possible. The construction shown prevents this, but the raised ledge 15 provides a satisfactory substitute, and enables the hog instinct to be gratified without actually getting his feet into the food. The semicircular recesses 18 in the front 17 enable the hogs to feed without discomfort and at the same time permits member 22 to be lowered sufficiently to keep the feet of the animals out of the feed. The adjustability of the member 22 permits it to be raised or lowered to accommodate the feed openings for what is suitable for the size of the animals. As the hogs increase in size and the openings become less than necessary for comfort and convenience, this member may be raised to suit the conditions. The construction also enables the trough as a whole to be readily cleaned and kept in a sanitary condition.

What I claim as new and desire to secure by Letters Patent, is:

1. A feeding trough comprising a base and upstanding ends, a plate disposed above the base and pivoted between the ends and its upper surface comprising an inclined plane for guiding the feed into the trough and its lower plane functioning as a feed guard, a section rigidly secured to the plate and standing substantially at right angles above such plate and means carried by the last mentioned section to adjust the combined element without disturbing the angular relation.

2. A feeding trough comprising a base adapted to receive feed, members positioned substantially parallel with each other at the ends and extending above the base, a plate positioned above the base and pivoted between the said parallel end members whose upper surface comprises an inclined plane for guiding the feed into the trough and whose lower surface serves as a feed guard, a section secured to the plate at an angle thereto and extending above such plate, said last mentioned section provided with means to adjust the combined element without disturbing the angular relation substantially as set forth and for the purpose thereof.

3. A feeding trough comprising a base and upstanding ends, a plate disposed above the base and pivoted between the ends and its upper surface comprising an inclined plane for guiding the feed into the trough and its lower plane functioning as a feed guard, a section rigidly secured to the plate and standing substantially at right angles above such plate, and means whereby the combined element may be adjusted on its pivot without disturbing the angular relation.

4. A feeding trough comprising a base and upstanding ends, a plate disposed above the base and pivoted between the ends and its upper surface comprising an inclined plane for guiding the feed into the trough and its lower plane functioning as a feed guard, a section rigidly secured to the plate and standing substantially at right angles above such plate, said upstanding ends having arcuate slots adapted to guide the combined element for adjustment about the said pivot without disturbing the angular relation, and means carried by the last mentioned section to secure the combined element in various positions.

In witness whereof I have hereunto set my hand and seal at Anaconda, Montana, this 28th day of March, A. D. nineteen hundred and nineteen.

PETER BARLAND. [L. S.]

Witnesses:
H. C. GARDINER,
J. R. HUTCHISON.